United States Patent [19]

Takase et al.

[11] Patent Number: 4,623,710

[45] Date of Patent: Nov. 18, 1986

[54] AROMATIC POLYESTER MOLDING

[75] Inventors: Junji Takase; Kazuya Yonezawa; Osamu Takamatu, all of Kobe, Japan

[73] Assignee: Kanegafuchi Kagaku Kogyo Kubushiki Kaisha, Osaka, Japan

[21] Appl. No.: 762,169

[22] Filed: Aug. 5, 1985

[30] Foreign Application Priority Data

Aug. 6, 1984 [JP] Japan ................... 59-164520

[51] Int. Cl.$^4$ .................. C08G 63/18; C08G 63/46
[52] U.S. Cl. ..................... 528/176; 528/180; 428/480
[58] Field of Search ................. 528/176, 180

[56] References Cited

U.S. PATENT DOCUMENTS 4,390,682  6/1983  Kyo et al. ..................... 528/194
4,440,920  4/1984  Fujikake et al. .................. 528/128

Primary Examiner—Lucille M. Phynes
Attorney, Agent, or Firm—Armstrong, Nikaido, Marmelstein & Kubovcik

[57] ABSTRACT

A molding article comprises a molding of an aromatic polyester comprising an aromatic dicarboxylic acid and a bivalent phenol compound on which a layer of a metal or a metal oxide is deposited. The molding article has excellent heat resistance, transparency and surface resistance.

9 Claims, No Drawings

AROMATIC POLYESTER MOLDING

BACKGROUND OF THE INVENTION

The present invention relates to a molding article of an aromatic polyester comprising an aromatic dicarboxylic acid and a bivalent phenol compound molding having a metal or metal oxide layer deposited on a surface thereof. Preferably, aromatic polyester has at least one member selected from the group consisting of units having the formula (I) and units having the formula (II):

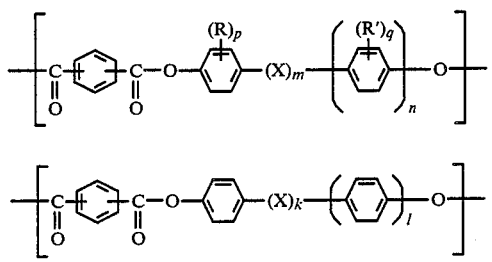

wherein X is a bivalent substituted or unsubstituted hydrocarbon group having 1 to 10 carbon atoms, —O—, —S—, —$SO_2$— or —CO—; R and R' are same or different and each is a monovalent group having 1 to 20 carbon atoms selected from the group consisting of an alkyl group, an allyl group, an aralkyl group, an alkoxy group, an allyloxy group, an allylalkoxy group and substituted group thereof, or a halogen atom; p and q are an integer, provided that $p+q=1$ to 8; and m, n, k and l are 0 or 1, provided that n is 1 when m is 1 and l is 1 when k is 1; and a molar ratio of the units (I)/[the units (I)+the units (II)]=1 to 0.

Recently, a molding article having a metal or metal oxide layer which is deposited on a surface of a polymer molding has been employed in various fields, for instance, a magnetic recording material for a video tape recorder, a computer device and a word processor, such as a magnetic recording tape, a compact disk or a floppy disk; a transparent window material for a solid display device such as an electroluminescence display device, a liquid crystal display device or an electrochromic display device, a transparent switch of a computer terminal device, a meter, and the like; an antistatic material such as a display window of a television set or a packing material of a semiconductor device; a photoelectric conversion element such as a solar battery or a light amplifier; a transparent plate for heating such as a window of a defroster, an airplane, a car, a freezer or the like. For instance, a floppy disk used as a memory of a computer device is prepared by coating a biaxially stretched polyethylene terephthalate tape with a magnetic material. Recently, the floppy disk has been gradually made smaller to a diameter of 3 to 3.5 inches. According to the miniaturization, the computer device itself has been made compact and the computer device can be carried to any place and employed under various environments and conditions.

However, the conventionally used molding article is not sufficient in dimensional stability under a hot and humid environment and does not necessarily have sufficient performances. In the field of the solid display for a liquid crystal display device and a electroluminescence display device, an electrically conductive transparent film has been employed instead of an electrically conductive transparent glass from demands that the device is made lighter and thinner.

As the polymer molding of such an electrically conductive transparent film, there is proposed to use a polyimide film. However, though the polyimide film has an excellent heat resistance and a dimensional stability, the applicable fields of the electrically conductive transparent film of polyimide are remarkably narrowed because the polyimide film has a poor transparency and a high water absorption.

A biaxially stretched film of polyethylene terephthalate is excellent in transparency, mechanical properties and dimensional stability at ordinary temperature. However, dimensional stability of the film at an elevated temperature is insufficient and it is difficult to employ the film for the use where soldering is required because a second order transition temperature of the film is low. Moreover, since birefringence of the film is large due to uniaxial stretching, complicated procedures are required in order to apply the film to the liquid crystal display device which utilizes polaring phenomenon.

Also, there is proposed biaxially stretched polyethylene-2,6-naphthalene dicarboxylate film for improving the heat resistance of the above-mentioned polyethylene terephthalate film. However, the former film has also a large birefringence and an unsatisfactory soldering resistance.

As a result of the present inventor's intensive study relating to a molding article having a metal or metal oxide layer deposited on a surface of a polymer molding, it has been found the fact that a molding article having an extremely improved heat resistance can be obtained when an aromatic polyester is used as the polymer molding, and then the present invention has been completed.

This and other objects of the present invention will become apparent from the description hereinafter.

SUMMARY OF THE INVENTION

In accordance with the present invention, there is provided a molding article comprising a molding of an aromatic polyester comprising an aromatic dicarboxylic acid and a bivalent phenol compound on which a layer of a metal or a metal oxide is deposited.

DETAILED DESCRIPTION

The aromatic polyesters used in the invention preferably has at least one member selected from the group consisting of units having the formula (I) and units having the formula (II):

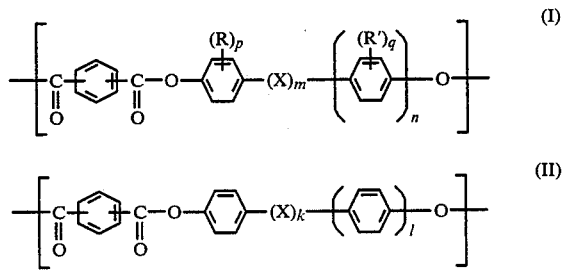

wherein X is a bivalent substituted or unsubstituted hydrocarbon group having 1 to 10 carbon atoms, —O—, —S—, —$SO_2$— or —CO—; R and R' are same or different and each is a monovalent group having 1 to 20 carbon atoms selected from the group consisting of an alkyl group, an allyl group, an aralkyl group, an alkoxy group, an allyloxy group, an allylalkoxy group and substituted group thereof, or a halogen atom; p and q are an integer, provided that $p+q=1$ to 8; and m, n, k and l are 0 or 1, provided that n is 1 when m is 1 and l is 1 when k is 1; and a molar ratio of the units (I)/[the units (I)+the units (II)]=1 to 0.

In the present invention, a metal or a metal oxide is deposited on the surface of the above-mentioned aromatic polyester molding.

Particularly, in case of the aromatic polyesters in which the units (I) are aromatic polyester sulfones having the formula:

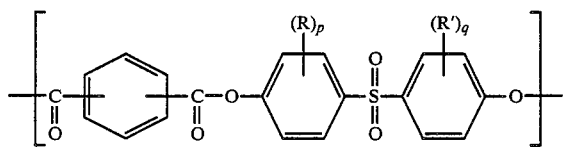

wherein R, R', p and q are as defined above, or aromatic polyesters having substituents at the 3 and 5 positions of the bisphenol component, namely units of the formula:

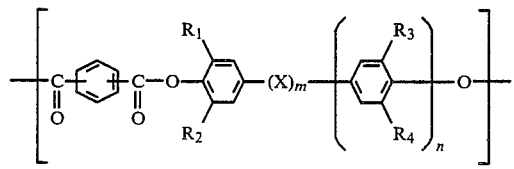

wherein $R_1$, $R_2$, $R_3$ and $R_4$ are a monovalent group having 1 to 4 carbon atoms selected from the group consisting of an alkyl group and an alkoxyl group, a phenyl group above, improvement of the heat resistance, e.g. soldering resistance is remarkable.

Further, in case of the aromatic polyesters in which the units (I) are aromatic polyester sulfones having substituents at the 3 and 5 positions of the bisphenol component, namely units of the formula:

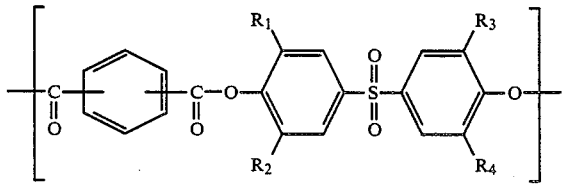

wherein $R_1$, $R_2$, $R_3$ and $R_4$ are as defined above, the above improvement is extremely remarkable. Among them, an aromatic polyester sulfone having —CH₃ at the 3 and 5 positions of the bisphenol component, namely units of the formula:

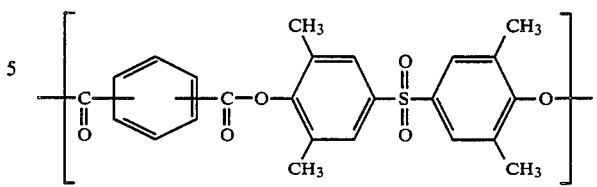

is particularly useful in views of its hydrolysis resistance, alkali resistance, and is also advantageous in that the bisphenol used as a raw material is easily obtainable.

The second order transition temperature of such polyester sulfones is higher than that of a commercially available aromatic polyester prepared by bisphenol A (2,2-bis(4-hydroxyphenyl)propane) and IPC/TPC (isophthalic acid chloride/terephthalic acid chloride) by 85° to 100° C. Also, the aromatic polyester film of the invention prepared by a casting method has an excellent transparency. For instance, the absorbance of the above film having a thickness of 100 μm is very low, i.e. at most 0.05 over all wavelengthes within the visible region. Moreover, the film is tough and has a high tensile strength as shown in Example.

The aromatic polyesters of the invention may be copolymers of the units (I) and the units of the formula (II):

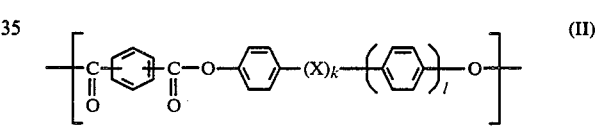

wherein X, k and l are as defined above, in a molar ratio of the units (I)/[the units (I)+the units (II)]=1 to 0. From viewpoint of the heat resistance, it is preferable that the molar ratio of the units (I)/[the units (I) +the units (II)] is within a value of 1 to 0.3. The melt moldability of the aromatic polyesters can be improved by introducing the units (II) into the polyesters to be a copolymer.

As a starting material of the aromatic polyester of the present invention there can be preferably employed a bis(4-hydroxy-diphenyl)sulfone having substituents at the aromatic ring, for instance, a compound of the formula (III):

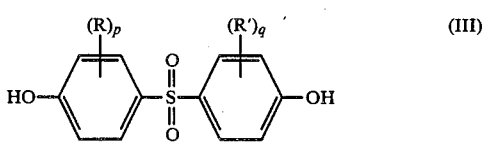

wherein R, R', p and q are as defined above, or a compound having substituents at the 3 and 5 positions of the aromatic ring, namely a compound of the formula (IV):

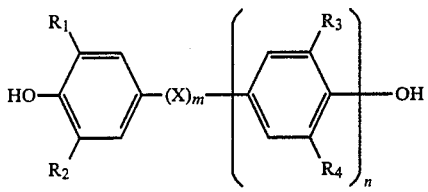

(IV)

wherein m, n, X, $R_1$, $R_2$, $R_3$ and $R_4$ are as defined above. Among the above compounds, an aromatic polyester sulfone having substituents at the 3 and 5 positions of the aromatic ring, namely a compound of the formula (V):

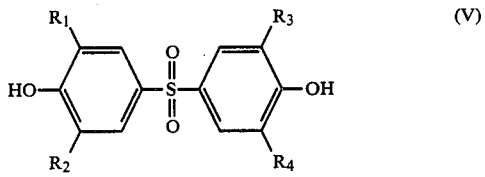

(V)

wherein $R_1$, $R_2$, $R_3$ and $R_4$ are as defined above, is preferably employed.

Typical examples of the sulfone compound are, for instance, bis(4-hydroxy-3-methylphenyl)sulfone, bis(4-hydroxy-3,5-dimethylphenyl)sulfone, bis(4-hydroxy-3-ethylphenyl)sulfone, bis(4-hydroxy-3,5-diethylphenyl)sulfone, bis(4-hydroxy-3,5-dimethoxyphenyl)sulfone, bis(4-hydroxy-3,5-diethoxyphenyl)sulfone, and the like. Particularly, bis(4-hydroxy-3,5-dimethylphenyl)sulfone is useful among them in view of easy obtaining.

The compound having the formula (III) may be employed alone or in admixture of the compound (I) and a difunctional phenol compound having the formula:

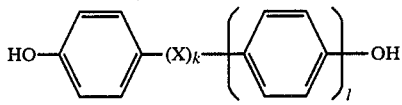

wherein X, k and l are as defined above, in an optional proportion. Typical examples of the difunctional compound are, for instance, 2,2-bis(3,5-dimethyl-4-hydroxyphenyl)propane, 2,2-bis(3,5-di-sec-butyl-4-hydroxyphenyl)propane, 2,2-bis(3,5-di-tert-butyl-4-hydroxyphenyl)propane, bis(3,5-dimethyl-4-hydroxyphenyl)methane, 1,1-bis(3,5-dimethyl-4-hydroxyphenyl)ethane, 1,1-bis(3,5-dimethyl-4-hydroxyphenyl)cyclohexane, bis(3,5-dimethyl-4-hydroxyphenyl)ketone, bis(3,5-dimethyl-4-hydroxyphenyl)ether, bis(3,5-dimethyl-4-hydroxyphenyl)sulfide, 2,2-bis(3,5-dimethyl-4-hydroxyphenyl)hexafluoropropane, 2,2-bis(3,5-dimethoxy-4-hydroxyphenyl)propane, bis(3-methoxy-4-hydroxy-5-methylphenyl)methane, 2,2-bis(3-methoxy-4-hydroxy-5-methylphenyl)-propane, bis(3-methoxy-4-hydroxy-5-methylphenyl)methan, bis(3,5-diphenyl-4-hydroxyphenyl)methane, 2,2-bis(3,5-diphenoxy-4-hydroxy-phenyl)propane, bis(3-phenoxy-4-hydroxy-5-methyl)methane, 4,4'-dihydroxy-3,3',5,5'-tetramethylbiphenyl, 4,4'-dihydroxy-3,3',5,5'-tetraethylbiphenyl, an admixture thereof, and the like. Typical examples of the monocyclic difunctional compound are, for instance, hydroquinone, resorcinol, and the like. Also, a bisphenolic coloring matter such as phenolphthalein, fluorescein, naphthophthalein or thymolphthalein can be employed. These components may be employed alone or in admixture thereof.

The aromatic polyesters used in the present invention can be easily prepared by employing a phase transfer catalyst. That is to say, the aromatic polyesters are prepared by reacting an alkali metal salt of the difunctional phenol compound with the dicarboxylic acid dihalide in the presence of a phase transfer catalyst. For instance, a difunctional phenol compound is added to an aqueous solution of a hydroxide of an alkali metal such as potassium or sodium and is reacted with the alkali metal hydroxide to form an aqueous solution of an alkali metal salt of the difunctional phenol compound. To the aqueous solution of the alkali metal salt of the difunctional phenol compound is added a solution of a dicarboxylic acid dihalide in an organic solvent which is substantially immiscible with water, and they are reacted in the presence of a phase transfer catalyst. It is necessary that the alkali metal salt of the difunctional phenol compound contains at least 1% by mole of an alkali metal salt of the biphenol compound. The concentration of the aqueous solution of the alkali metal salt of the difunctional phenol compound can be employed in arbitrary concentrations.

Examples of the metal and the metal oxide employed in the present invention are, for instance, Fe, Ni, Cr, Co, Al, Ag, Ge, Pd, Pt, In, Cu, Au, Ti and oxides thereof. When a magnetic substance such as a Co-Cr alloy, a Co-Ni alloy, an iron oxide, a chromium oxide or a baliumiron oxide is employed as the metal or the metal oxide, the obtained molding article can be used as a magnetic tape or a floppy disk. The article of the invention can be used under severe environments and conditions because of the excellent dimentional stability at a high temperature, which is an advantage of the aromatic polyester employed in the present invention.

Since the aromatic polyester molding of the invention has an excellent transparency, a transparent electrically conductive molding article can be obtained by depositing a transparent electrically conductive metal or metal oxide layer on the aromatic polyester molding of the invention. Examples of the transparent conductive metal or metal oxide are, for instance, gold, silver, copper, paradium, ITO, $SnO_2$, CuI, a laminated layer prepared by interposing a gold, silver, copper or paradium layer between transparent thin films having a high refractive index containing a metal oxide such as titanium, zinc, indium, tin, yttrium, zirconium, hafnium, erbium or cerium, as a main component. Particularly, indium tin oxide (ITO) is preferably employed as the metal oxide in view of the transparency and the surface resistance of the finishing article. The deposition of the metal or metal oxide layer including ITO layer can be achieved by various methods such as vacuum deposition, reactive vacuum deposition (under low atmosphere and oxygen gas), DC sputtering, RF sputtering ion plating.

The electrically conductive ITO layer can be deposited on the aromatic polyester sulfone film used in the invention by employing every method mentioned above. Particularly, when employing the vacuum deposition, the temperature of the film can be heated up to about 290° C. because of its high second order transition temperature. Accordingly the finishing article of the present invention is very advantageous in transparency and surface resistance. That is to say, in the present invention, the transparent film having a low surface resistance can be obtained by means of the vacuum deposition of ITO at about 250° C. under an oxigen atmosphere of a low pressure ($5 \times 10^{-4}$ Torr) without any complicated operation such as heat oxidation treatment after the deposition.

Further, the aromatic polyester sulfone film used in the present invention have a sufficient mechanical strength without biaxial streching. Also the birefringence of the film is small because of its amorphous state, and thus the resulting article is preferably employed for the liquid crystal display utilizing the polarizing phenomenon. In case that an electrically conductive transparent film is jointed to electronic device by electrically contacting the film with an electric circuit, a heat resistance of a polymer film in a molten solder bath comes into problem. When employing the aromatic polyester sulfone of the present invention, however, a molten solder bath having a temperature of 280° C. can be employed.

The present invention is more specifically described and explained by means of the following Examples. It is to be understood that the present invention is not limited to Examples, and various changes and modifications may be made in the invention without departing from the spirit and scope thereof.

the polymer was 1.30 dl/g in a mixture solvent of phenol and 1,1,2,2-tetrachloroethane (1:1 by weight) at a temperature of 32° C. in a concentration of 0.32 g/dl.

After 6.5 g of the obtained polymer was dissolved in 43.5 g of 1,1,2,2-tetrachloroethane, the mixture was coating on a glass plate and the solvent was removed by heating on a hot plate at 50° C. for 20 minutes, then at 100° C. for 20 minutes and finally at 150° C. for 20 minutes. After the heating, the formed film was peeled off from the glass plate and was fixed by means of jigs at its four sides. A heat-setting of the film was carried out at 300° C. for 10 minutes to give a film having a thickness of about 100 μm.

The obtained film was cut off into rectangular pieces having a width of 1 cm. The pieces was dipped into a molten solder having a temperature of 260° C. and 280° C. for 10 seconds. No change of the pieces was caused by dipping into the molten solder.

The results are shown in Table 1.

Other commercially available polyesters were tested in the same manner as in the above. The tested commercially available polyesters were polyarylate comprising bisphenol A and TPC/IPC (1:1 by weight), polyether ether ketone (PEEK), polysulfone (PS), The results are shown in Table 1.

TABLE 1

|  |  | Dipping at 280° C. for 10 sec | | Dipping at 260° C. for 10 sec | |
|---|---|---|---|---|---|
|  |  | Change of length (%) | Appearance | Change of length (%) | Appearance |
| Ex. 1 | TM-bis-S—polyarylate[1] | ±0 | No change | ±0 | No change |
| Com. Ex. 1 | Polyacrylate | −2 | Large change | −2.5 | Large change |
| Com. Ex. 2 | PEEK | −6 | Large change (whitened) | −4 | Large change (whitened) |
| Com. Ex. 3 | PS | −3 | Large change | −4 | Large change |
| Com. Ex. 4 | PES | ±0 | Large change (foamed) | ±0 | Change |
| Com. Ex. 5 | PC | — | — | +22 | Shape was slightly maintained |

Note: [1] tetramethyl-bissulfone-polyarylate

EXAMPLE 1 AND COMPARATIVE EXAMPLES 1 to 5

To 750 ml of a 1N aqueous sodium hydroxide solution were added and dissolved 91.0 g (297 millimoles) of bis-(4-hydroxy-3,5-dimethylphenyl)sulfone, 0.90 g (6 millimoles) of p-tert-butylphenol, 2.61 g (15 millimoles) of sodium dithionite and 0.204 g (0.6 millimole) of tetrabutyl phosphonium bromide under a nitrogen stream and the solution was cooled in an ice bath. Separately, 36.65 g (180 millimoles) of terephthalic acid chloride and 24.36 g (120 millimoles) of isophthalic acid chloride were dissolved in 1000 ml of methylene chloride and the solution was cooled in an ice bath. The latter solution was added to the former solution and the resulting mixture was stirred for 50 minutes. After adding 4.2 g (30 millimoles) of benzoyl chloride, the agitation was further continued for 15 minutes. After stopping the stirring, the methylene chloride layer was washed twice with water, and then the methylene chloride layer was neutralized with stirring while pH of the aqueous layer was kept at about 4 with a dilute hydrochloride. After the mixture was further washed four times with water, 3000 ml of acetone was poured into the mixture to precipitate a white polymer. The white polymer was collected by filtration and washed with 2000 ml of acetone. Then, the white polymer was dried under a reduced pressure at 100° C. for 5 hours to give 121.5 g of the polymer. The yield was 93%. The reduced viscosity of Further, the transmittance of the obtained film (TM-bis-S-polyarylate) of present invention was measured in ultraviolet and visible region.

The results are shown in Table 2.

TABLE 2

| Wavelength (nm) | Transmittance (%) |
|---|---|
| 400 | 94 |
| 500 | 96 |
| 600 | 96 |
| 700 | 96 |
| 800 | 96 |
| 900 | 96 |

In a UNIVAC EBH-6 available from Nippon Shinku Kabushiki Kaisha, the film of TM-bis-S-polyarylate of the present invention was fixed on a heating plate of 250° C. After reducing a pressure in the apparatus to $8 \times 10^{-6}$ mmHg, oxigen gas was introduced so as to be an oxygen partial pressure of $5 \times 10^{-4}$ mmHg, and then an ITO layer was deposited on the film by means of vacuum deposition at a deposition rate of 2Å/sec with an electron beam (beam acceleration voltage: 10 kV, beam current: 15 mA, target: $In_2O_3$ containing 5% by weight of $SnO_2$). The thickness of the ITO layer was 500 Å, and the surface resistivity was 87Ω/□.

The transmittance of the obained article was measured in ultraviolet and visible region The results are shown in Table 3.

TABLE 3

| Wavelength (nm) | Transmittance (%) |
| --- | --- |
| 400 | 86 |
| 500 | 90 |
| 600 | 90 |
| 700 | 90 |
| 800 | 90 |
| 900 | 90 |

What we claim is:

1. A molding article comprising a molding of an aromatic polyester comprising an aromatic dicarboxylic and a bivalent phenol compound on which a layer of a metal or a metal oxide is deposited.

2. The molding article of claim 1, wherein said aromatic polyester has at least one member selected from the group consisting of units having the formula (I) and units having the formula (II):

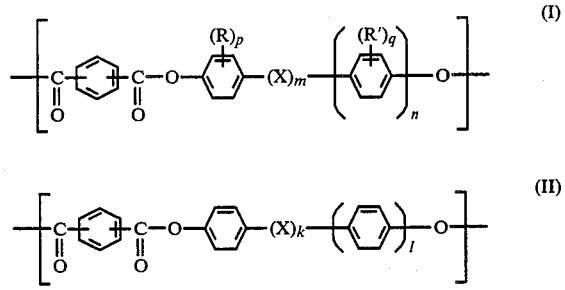

wherein X is a bivalent substituted or unsubstituted hydrocarbon group having 1 to 10 carbon atoms, —O—, —S—, —SO$_2$— or —CO—; R and R' are same or different and each is a monovalent group having 1 to 20 carbon atoms selected from the group consisting of an alkyl group, an allyl group, an aralkyl group, an alkoxy group, an allyloxy group, an allylalkoxy group and substituted group thereof, or a halogen atom; p and q are an integer, provided that p+q=1 to 8; and m, n, k and l are 0 or 1, provided that n is 1 when m is 1 and l is 1 when k is 1; and a molar ratio of the units (I)/[the units (I)+the units (II)]=1 to 0.

3. The molding article of claim 2, wherein said units (I) are those having the formula:

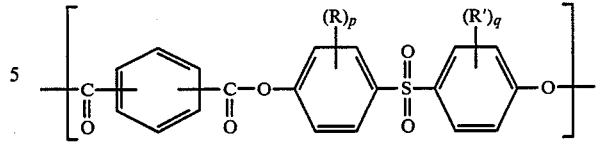

wherein R, R', p and q are as defined above.

4. The molding article of claim 2, wherein said units (I) are those having the formula:

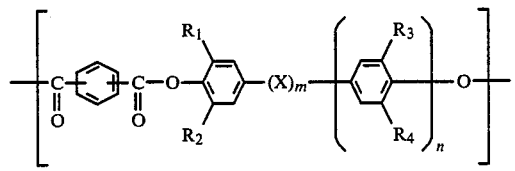

wherein $R_1$, $R_2$, $R_3$ and $R_4$ are a monovalent group having 1 to 4 carbon atoms selected from the group consisting of an alkyl group and an alkoxyl group, a phenyl group and a halogen atom, and X, m and n are as defined above.

5. The molding article of claim 2, wherein said units (I) are those having the formula:

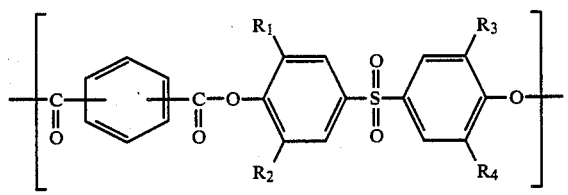

wherein $R_1$, $R_2$, $R_3$ and $R_4$ are as defined above.

6. The molding article of claim 2, wherein said units (I) are those having the formula:

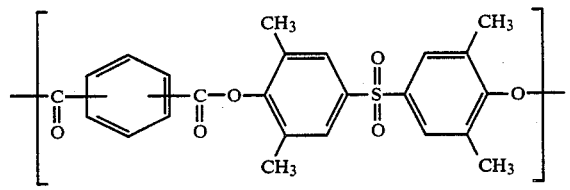

7. The molding article of claim 1, wherein said metal or metal oxide is a magnetic metal or a magnetic metal oxide.

8. The molding article of claim 1, wherein said layer is electrically conductive and transparent.

9. The molding article of claim 1, wherein said aromatic polyester molding has a form of film or sheet.

* * * * *